United States Patent
Seo et al.

(10) Patent No.: US 7,656,765 B2
(45) Date of Patent: Feb. 2, 2010

(54) APPARATUS AND METHOD FOR CONTROLLING TRACKING SERVO IN NEAR FIELD OPTICS

(75) Inventors: Jeong Kyo Seo, Gwacheon-si (KR); Yun Sup Shin, Sungnam-si (KR); Jin Yong Kim, Sungnam-si (KR)

(73) Assignee: LG Electronics Inc., Seoul (KR)

( * ) Notice: Subject to any disclaimer, the term of this patent is extended or adjusted under 35 U.S.C. 154(b) by 766 days.

(21) Appl. No.: 11/285,208

(22) Filed: Nov. 23, 2005

(65) Prior Publication Data

US 2006/0133231 A1 Jun. 22, 2006

(30) Foreign Application Priority Data

Nov. 24, 2004 (KR) .................. 10-2004-0096721

(51) Int. Cl.
*G11B 7/00* (2006.01)
(52) U.S. Cl. ............. 369/53.23; 369/44.41; 369/112.24
(58) Field of Classification Search ... 369/44.23–44.25, 369/44.27–44.29, 44.32–44.33, 44.35–44.36, 369/44.41, 53.19, 53.22–53.23, 53.28, 112.01, 369/112.23–112.26
See application file for complete search history.

(56) References Cited

U.S. PATENT DOCUMENTS

| | | | | |
|---|---|---|---|---|
| 5,150,348 A | * | 9/1992 | Fujita | ........... 369/44.41 |
| 2002/0018411 A1 | | 2/2002 | Kumagai | |
| 2005/0190666 A1 | * | 9/2005 | Ishimoto | ........... 369/44.25 |

* cited by examiner

*Primary Examiner*—Andrea L Wellington
*Assistant Examiner*—Nathan Danielsen
(74) *Attorney, Agent, or Firm*—Birch, Stewart, Kolasch & Birch, LLP

(57) ABSTRACT

Disclosed are an apparatus and a method for controlling a tracking servo in a near field optics. Gap error signals are detected in a divided state, and a push pull signal is compensated based on the detected gap error signals. A photo detector detecting the gap error signals is divided into two areas such that movement of an image formed on the photo detector can be detected. The push pull signal is compensated by subtracting a value proportional to a difference value between the two gap error signals detected in the photo detector. The difference value between the two gap error signals is proportional to a dc offset component included in the push pull signal. Accordingly, it is possible to simply remove a dc offset included in a push pull signal without largely modifying the near field optics, so that it is possible to exactly perform a tracking servo operation.

8 Claims, 5 Drawing Sheets

FIG. 6
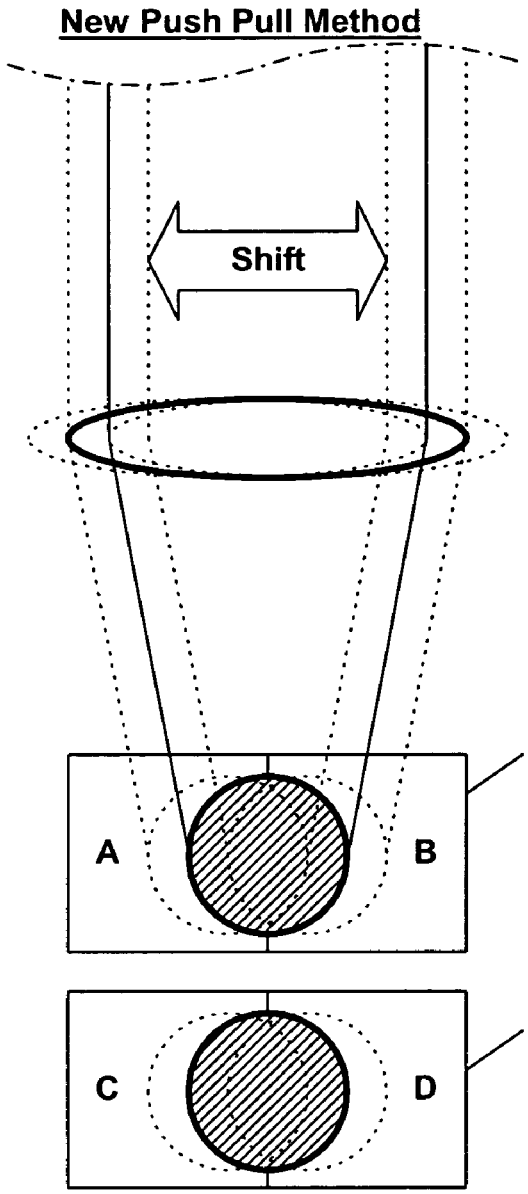
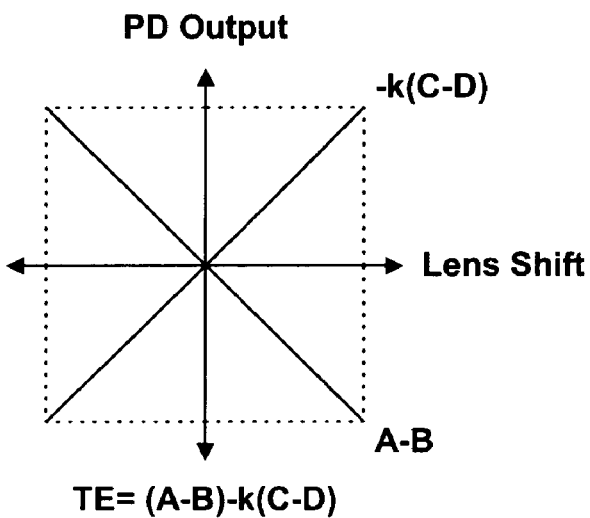
TE= (A-B)-k(C-D)

APPARATUS AND METHOD FOR CONTROLLING TRACKING SERVO IN NEAR FIELD OPTICS

BACKGROUND OF THE INVENTION

1. Field of the Invention

The present invention relates to an apparatus and a method for controlling a tracking servo in a near field optics, and more particular to an apparatus and a method for removing a dc offset of a one-beam push pull signal in a near field optics.

2. Description of the Related Art

Digital versatile discs (DVD), which are capable of recording and storing high definition video data and high sound quality audio data with a high capacity, are widely used, and it is expected that blu-ray discs (BD), which have a higher recording density as compared with the DVD, will be developed and commercialized.

The DVD has a storage capacity of about 4.7 GB, and the BD has a storage capacity of about 25 GB. Recently, next generation high definition discs such as a near field recording disc or a near field disc having a recording density much higher than that of the BD are being researched.

The near field disc may be called another name and has recording capacities of 140 GB to 160 GB. As shown in FIGS. 1 and 2, since a numerical aperture (NA) of an objective lens provided in an optical pickup for the near field disk must have a higher value than that for the BD in order to record data in high definition, a solid immersion lens 11 in a hemisphere shape is formed in front of an objective lens 10, thereby increasing the numerical aperture.

In addition, the tracking servo scheme for an optical disc includes a one-beam push pull scheme as shown in FIG. 3. A laser beam reflected from the optical disc passes through an objective lens, is incident on a photo detector 20 which is divided into an A area and a B area, and is converted into an A signal and a B signal in the A area and the B area of the photo detector, respectively, in order to detect a push pull signal. Then, a difference between the two signals is used as a tracking error signal (TE=(A−B)).

Then, a tracking servo operation, which moves the objective lens right and left in a direction parallel to a surface of the optical disc, is performed, so that the tracking error signal becomes a minimum value (e.g., TE=0). According to the one-beam push pull scheme, when the objective lens is moved as described above, a laser beam incident on the photo detector is moved right and left, so that an optical offset is caused between the A area and the B area.

Since the optical offset caused as described above is not divided from a tracking error in a state where a tracking servo is turned on, the optical offset is a main factor causing a tracking servo error such as a "de-track" phenomenon in which a laser beam deviates from a center of a track in an optical disc having eccentricity.

In order to solve the problem, a differential push pull scheme using one main beam, two sub beams, and three photo detectors 30, 31, and 32 may be employed as shown in FIG. 4. According to the differential push pull scheme, while using the A signal and the B signal derived from the main beam as a push pull signal (A−B), an offset value included in the push pull signal, that is, the DC-offset component is removed by combining an E signal and a G signal and an F signal and an H signal derived from the two sub beams with each other in the form of "k{(E+F)−(G+H)}", and subtracting the "k{((E+F)−(G+H)}" from the push pull signal (A−B).

In addition, a tracking servo operation allowing the objective lens to move right and left in a direction parallel to a surface of the optical disc is performed, so that the tracking error signal (TE={(A−B)}−k{(E+F)−(G+F)}, in which the dc offset component is removed, becomes a minimum value (e.g., TE=0).

However, as described above, one main beam, two sub beams, and three photo detectors must be used through the differential push pull scheme. To this end, the optical disc must be spaced from the objective lens with a predetermined distance. Accordingly, it is difficult to apply the differential push pull scheme to near field recording in which data must be recorded and reproduced in a state where the objective lens is much close to the optical disc.

In addition, as described above, since the dc offset component cannot be removed when the one-beam push pull scheme is applied, an error occurs in the tracking servo operation.

SUMMARY OF THE INVENTION

Accordingly, the present invention has been made to solve the above-mentioned problems occurring in the prior art, and an object of the present invention is to provide an apparatus and a method for stably performing a tracking servo operation in a near field optics.

Another object of the present invention is to provide an apparatus and a method for removing a dc offset from a one-beam push pull signal in a near field optics.

In order to achieve at least the above objects and advantages in a whole or in part, in accordance with one aspect of the present invention there is provided a method for controlling a tracking servo in a near field optics that includes compensating a push pull signal using a divided and detected gap error signals detected in a divided state.

Preferably, a photo detector detecting the gap error signals is divided into two areas such that movement of an image formed on the photo detector can be detected. The push pull signal is compensated by subtracting a value proportional to a difference value between the two gap error signals detected in the photo detector. The difference value between two gap error signals is proportional to a dc offset component included in the push pull signal.

In accordance with another aspect of the present invention, there is provided an apparatus for controlling a tracking servo in a near field optics that includes a first optical-electric converter for detecting a push pull signal; a second optical-electric converter for detecting gap error signals; and a tracking error detecting unit for compensating the push pull signal detected in the first optical-electric converter using the gap error signals detected in a divided state in the second optical-electric converter.

BRIEF DESCRIPTION OF THE DRAWINGS

The above and other objects, features and advantages of the present invention will be more apparent from the following detailed description taken in conjunction with the accompanying drawings, in which:

FIG. 6 is a view illustrating a one-beam push pull scheme allowing removal of a DC-offset component according to an embodiment of the present invention.

DETAILED DESCRIPTION OF PREFERRED EMBODIMENTS

Figure 1:
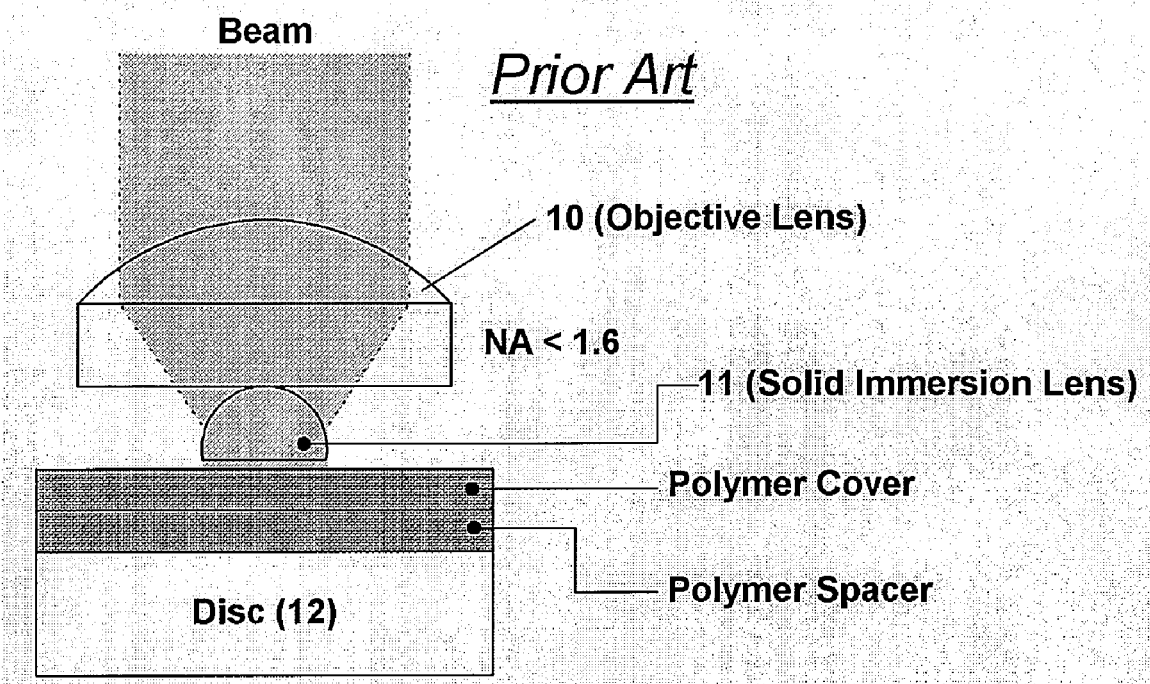
FIGS. 1 and 2 are views illustrating an objective lens (OL) and a solid immersion lens (SIL) for recording or reproducing data on a next generation high definition near field recording disc.
Figure 2:
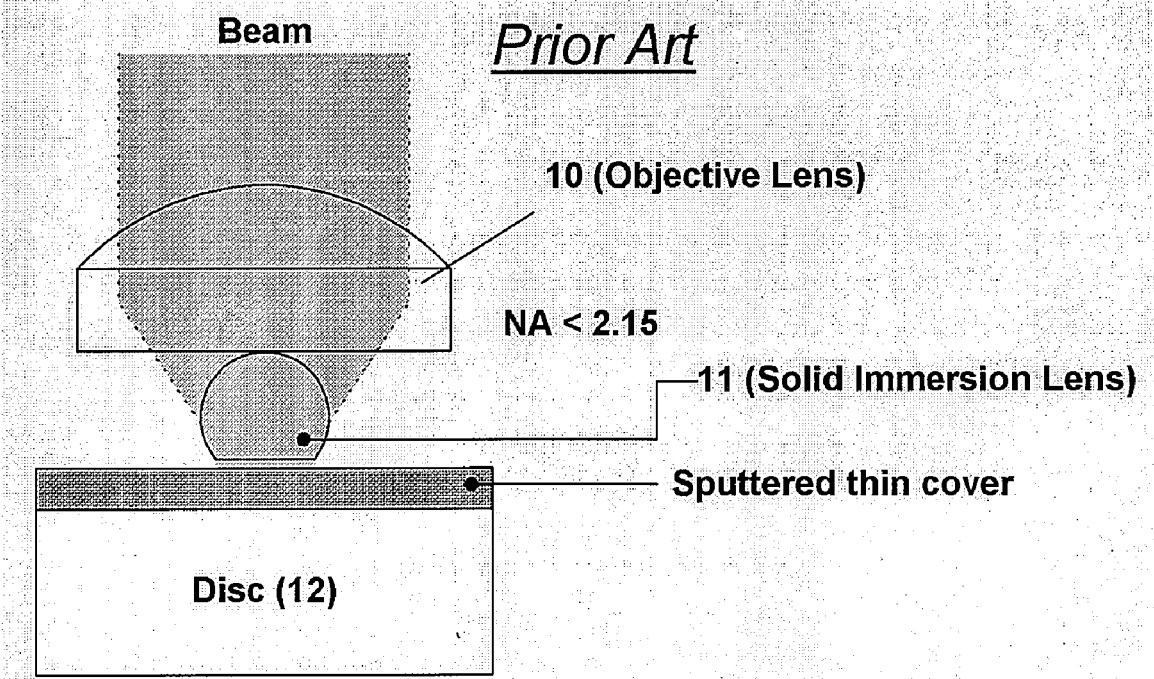
Figure 3:
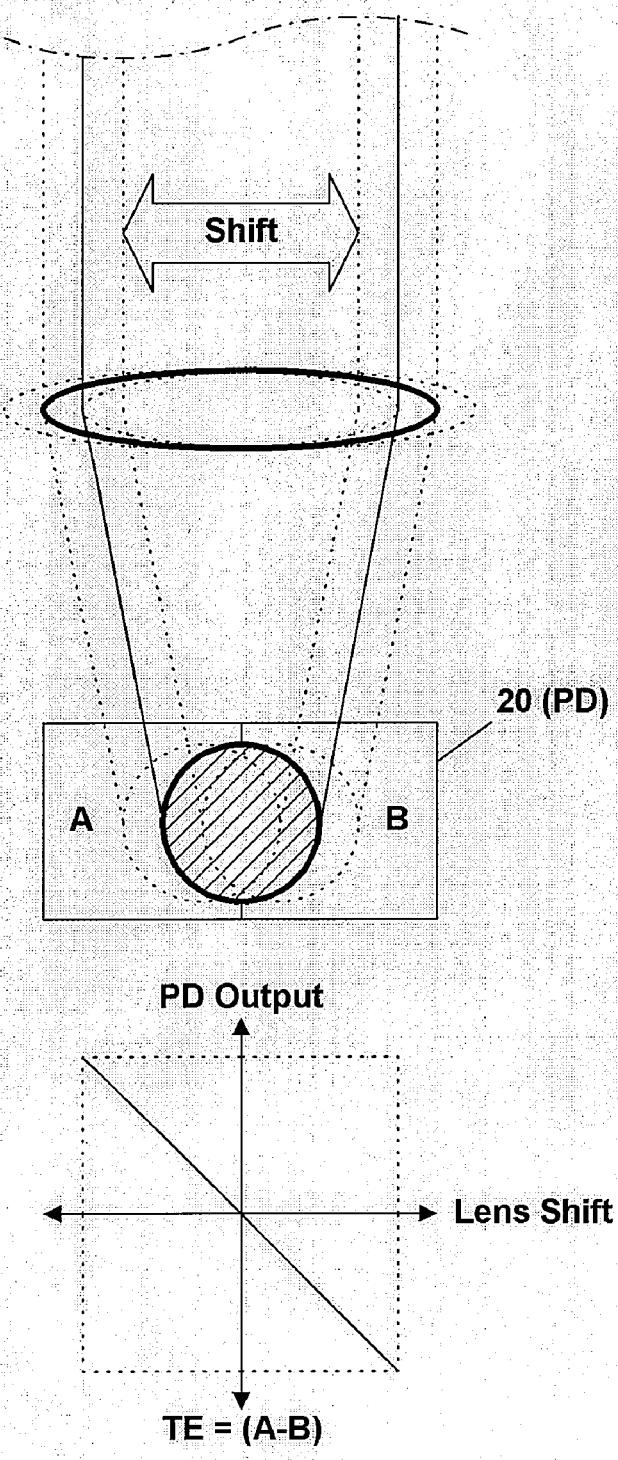
FIG. 3 is a view illustrating an example detecting a tracking error signal through a one-beam push pull (PP) scheme.
Figure 4:
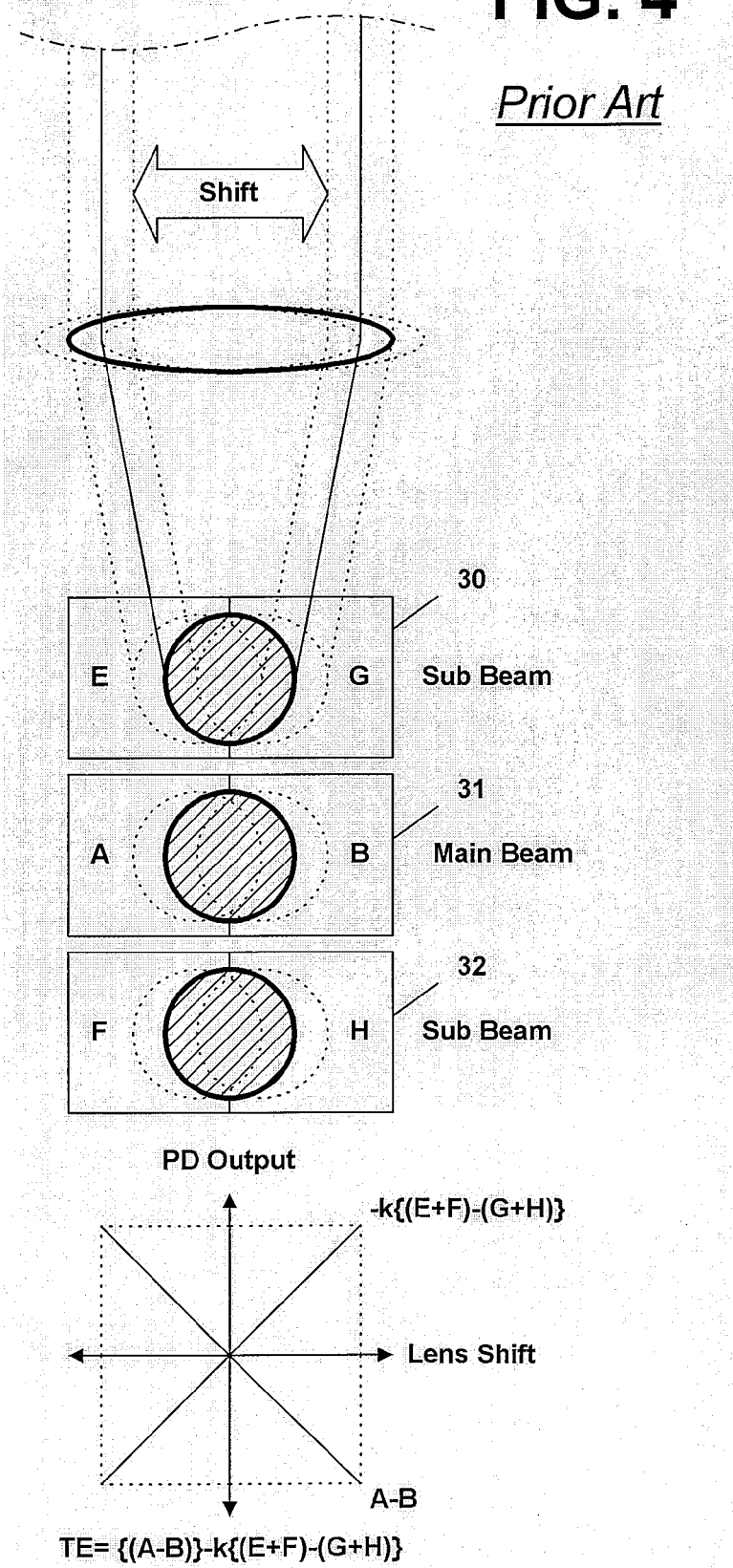
FIG. 4 is a view illustrating an example detecting a tracking error signal through a differential push pull (DPP) scheme.

Hereinafter, a preferred embodiment of the present invention will be described with reference to the accompanying drawings. In the following description and drawings, the same reference numerals are used to designate the same or similar components, and so repetition of the description on the same or similar components will be omitted.

A near field recording technique combines an objective lens with a solid immersion lens, and increases a numerical aperture of the objective lens to be about 2, thereby heightening a recoding density. In order to employ the near field recording technique, a constant distance between the objective lens and a disc must be maintained in a state where the lens is much close to the disc. To this end, it is necessary to employ an additional apparatus.

In a conventional far-field recording scheme, only a focus servo is sufficient to maintain a constant distance between an objective lens and a disc. However, in the near field recording scheme, it is almost impossible to maintain a constant distance between an objective lens and a disc, which is hereinafter referred to as a gap, simply by employing a focusing servo. In order to overcome the problem, an air bearing system employing a slide is reviewed, and, recently, a GAP servo scheme is developed and employed in the near field recording scheme.

A near field optics has four photo detectors including a photo detector (PD) for a tracking servo, a photo detector for detecting an RF signal, a photo detector for detecting a gap error signal (GES), and a photo detector for controlling an LD power. The PD for a tracking servo employs a two-division PD in order to detect a push pull signal, and remaining PDs include one cell. As mentioned above, the term "gap" refers to a distance between the optical disc and the objective lens. The photo detector for detecting a GES is used for a focusing servo. The focusing servo is performed by calibrating the gap according to the detected GES.

As described above, if a disc eccentricity occurs during the execution of a tracking servo operation, the center of an objective lens deviates from the center of an optical axis according to an amount of the disc eccentricity, so that beam moves in a push pull PD. Accordingly, a dc offset occurs in a push pull signal. The beam movement on the PD according to the movement of the lens is shown even in the PD for detecting a GES. Therefore, according to the present invention, the PD for detecting a GES is divided into two cells, and the movement of lens is analogized using a difference between two cell signals. In case of performing a focusing servo for maintaining or calibrating a gap or a distance between the objective lens and the optical disc, as mentioned above, signals from the two cells are also used. This is natural because the originally one cell is divided into two cells.

Figure 5:
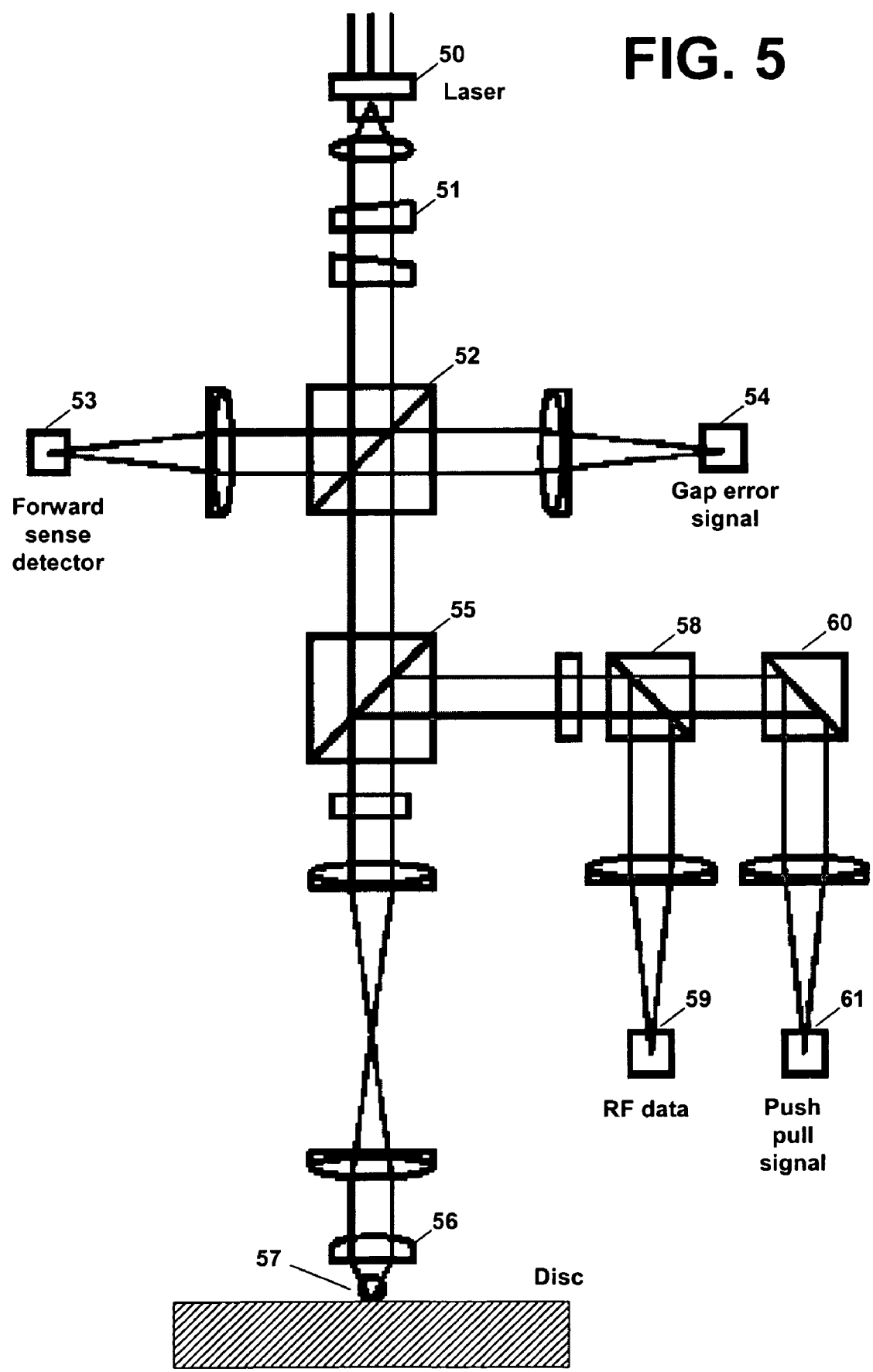
FIG. 5 is a view illustrating an optical pickup apparatus according to an embodiment of the present invention.

FIG. 5 illustrates an optical pickup according to an embodiment of the present invention. The optical pickup includes a laser diode 50, a beam former 51, and a plurality of splitters 52, 55, 58, and 60. In addition, the optical pickup includes a forward sense detector 53, a photo detector 54 for detecting a gap error signal, a photo detector 59 for detecting an RF signal, a photo detector 61 for detecting a push pull signal, an objective lens 56, and a solid immersion lens 57.

The forward sense detector 53 detects beam intensity by optical-electric converting a portion of a laser beam emitted from the laser diode 50. The photo detector 59 for detecting an RF signal outputs an RF signal by optical-electric converting a laser beam reflected from the optical disc. The photo detector 61 for detecting a push pull signal outputs a push pull signal used for detecting a tracking error signal (TE) by optical-electric converting a laser beam reflected from the optical disc.

The photo detector 54 for detecting the gap error signal outputs a gap error signal (GES) by optical-electric converting a laser beam reflected from the optical disc. According to the present invention, as shown in FIG. 6, the photo detector 54 for detecting the gap error signal is divided two areas C and D and calculates a difference value (C−D) between a C signal converted in the C area and a D signal converted in the D area.

In addition, as shown in FIG. 6, a tracking error signal (TE=(A−B)−k(C−D)) is detected by subtracting a value proportional to a difference value (C−D) of the C signal and the D signal from the push pull signal (A−B) which is a difference value between the A and B signals converted in the A area and B area of the push pull photo detector 61, respectively. A value "k (C−D)" proportional to the difference value of the C signal and the D signal corresponds to a dc offset component included in the push pull signal (A−B), and only a pure tracking error value, in which a dc offset component is removed, exists in the tracking error signal (TE).

A tracking servo controller according to the present invention performs a tracking servo operation of moving an objective lens right and left in a direction parallel to a surface of an optical disc such that the tracking error signal (TE=(A−B)−k(C−D)), in which the dc offset value is removed, becomes a minimum value (e.g., TE=0).

When the objective lens moves, a laser beam incident on the photo detector 61 for detecting a push pull signal moves such that an optical offset between the A area and the B area occurs. And, according to the movement of the objective lens, a laser beam incident on the photo detector 54 for detecting a gap error signal moves, so that an optical offset between the C area and the D area occurs. Accordingly, it is possible to detect a tracking error signal, in which a dc offset component corresponding to the optical offset is removed, by subtracting a "k(C−D)" proportional to a difference value between the C signal and the D signal from the push pull signal (A−B).

Accordingly, it is possible to apply a one-beam push pull scheme to a tracking servo operation of a near field optics which must record and reproduce data in a state where an objective lens is much close to an optical disc.

As described above, according to the present invention, it is possible to simply remove a dc offset included in a push pull signal without largely modifying the near field optics, so that it is possible to exactly perform a tracking servo operation.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method for controlling a tracking servo for an optical disc in a near field optics including an objective lens and a solid immersion lens, the method comprising:
compensating a push pull signal using gap error signals detected by a photo detector having two divided areas, wherein a gap corresponds to a distance between the objective lens and the optical disc.

2. The method as claimed in claim 1, wherein the push pull signal is compensated by subtracting a value proportional to a difference value between the two gap error signals detected in the photo detector.

3. The method as claimed in claim 2, wherein the difference value between the two gap error signals detected in the photo detector is proportional to a dc offset component included in the push pull signal.

4. The method as claimed in claim 1, wherein the push pull signal is detected through a one-beam push pull scheme.

5. An apparatus for controlling a tracking servo for an optical disc in a near field optics, the apparatus comprising:
   an objective lens;
   a solid immersion lens;
   a first optical-electric converter configured to detect a push pull signal;
   a second optical-electric converter having two divided areas, and configured to detect gap error signals, wherein a gap represents a distance between the objective lens and the optical disc; and
   a tracking error detecting unit configured to compensate the push pull signal detected in the first optical-electric converter using the gap error signals detected in the two divided areas in the second optical-electric converter.

6. The apparatus as claimed in claim 5, wherein the tracking error detecting unit subtracts a value proportional to a difference value between the two gap error signals detected in the second optical-electric converter from the push pull signal detected in the first optical-electric converter.

7. The apparatus as claimed in claim 6, wherein the difference value between the two gap error signals detected in the second optical-electric converter is proportional to a dc offset component included in the push pull signal.

8. The apparatus as claimed in claim 5, further comprising a control unit configured to move the objective lens such that the compensated push pull signal becomes minimized.

\* \* \* \* \*